J. C. COLFLESH.
Feed Rack.
No. 80,603.                                Patented Aug. 4, 1868.
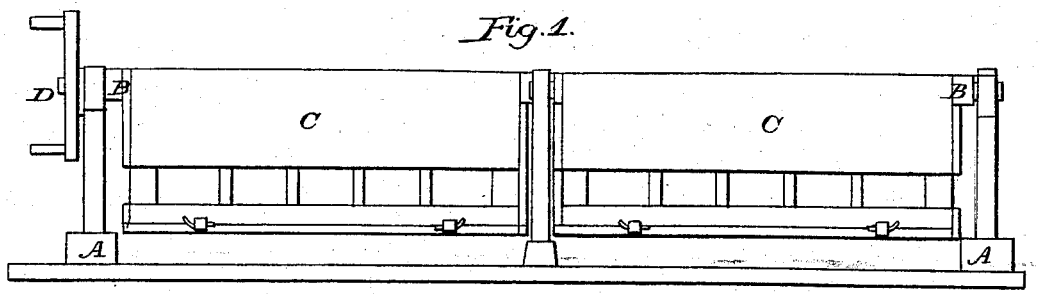
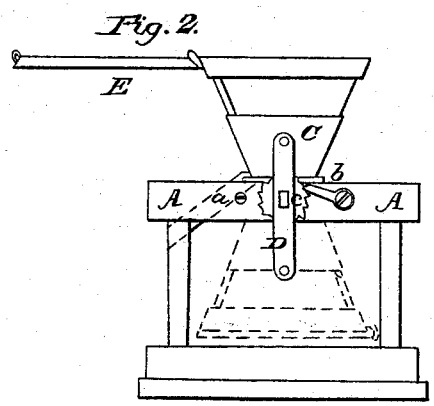

United States Patent Office.

J. C. COLFLESH, OF DELAWARE, OHIO.

Letters Patent No. 80,603, dated August 4, 1868.

IMPROVED RACK FOR FEEDING SHEEP.

The Schedule referred to in these Letters Patent and making part of the same.

TO ALL WHOM IT MAY CONCERN:

Be it known that I, J. C. COLFLESH, of Delaware, in the county of Delaware, and in the State of Ohio, have invented certain new and useful Improvements in Rack for Feeding Sheep; and do hereby declare that the following is a full, clear, and exact description thereof, reference being had to the accompanying drawings, and to the letters of reference marked thereon.

In the annexed drawings, forming part of this specification—
Figure 1 is a front view, and
Figure 2 a side view.

The nature of my invention consists in a portable revolving sheep-rack, so constructed that the hay will not fall to the ground, nor can the sheep trample it in the mud, and also to keep the hay dry in wet weather.

To enable others skilled in the art to make and use my invention, I will proceed to describe its construction and operation.

In the annexed drawings, A represents a frame, made of suitable material and necessary height, in the sides of which a shaft, B, has its bearings. On this shaft one, two, or more sheep-racks, C C, are constructed, and it is turned by a crank, D.

When the rack is turned in an upright position, as shown in fig. 2, the lid E is opened, and should fall back on a post or stake driven in the ground. This keeps the hay from falling over while being filled, and being trampled in the mud by the sheep in wet weather; and by this arrangement the sheep cannot get at the hay while the rack is being filled, and consequently there is no danger of injuring the head of the sheep with the hay-fork, nor of filling their wool with chaff.

The rack is held in the upright position on one side by a support, a, fastened to the inside of the frame A, and on the other by a pawl, b, in a notched wheel, c', which is attached to the shaft B near the crank, so that the operator can remove the pawl and turn the crank at the same time.

When the rack is filled, the lid is closed and fastened, and by the use of the crank the rack is turned down and ready for the sheep to go to eating.

The seed and heads of the hay, which are the best part of the feed for sheep, will all fall on the lid, and cannot be wasted, as in the old style of rack. In this manner a considerable saving in the feed is accomplished.

The rack is portable, and when made of light lumber can easily be taken to any part of the farm desired.

Having thus fully described my invention, what I claim as new, and desire to secure by Letters Patent, is—

The tapering rack C, supported on the frame A by means of its shaft B, and provided with a hinged lid, E, pawl c, and ratchet c', and operated by the crank, D, so that it can be revolved to prevent the sheep from feeding, to allow its being filled with provender, and prevent the ingress of rain or snow, as herein set forth.

In testimony that I claim the foregoing, I have hereunto set my hand, this 25th day of April, 1868.

J. C. COLFLESH.

Witnesses:
   THOS. R. SMITH,
   E. G. AVERY.